United States Patent Office 3,070,861
Patented Jan. 1, 1963

3,070,861
MOLDS UTILIZING ACID HYDROLYSED ISO-
PROPYL SILICATES AS BINDERS
Harold Garton Emblem, Grappenhall, and Earl White-
way Fothergill, Liverpool, England, assignors to Phila-
delphia Quartz Company, Philadelphia, Pa., a corpora-
tion of Pennsylvania
No Drawing. Filed Mar. 10, 1960, Ser. No. 13,988
7 Claims. (Cl. 22—193)

This invention relates to processes for binding particulate solid materials, more particularly refractory materials, and has as an object to provide an improved process for preparing a mixture of such materials and a binder. The invention also relates to processes in which the mixture is shaped to the form desired and the binder hardened, more especially to processes of this kind for the preparation of moulds for the casting of metals.

Ethyl silicates have been used for binding particulate refractory materials because of their ability to hydrolyse with water to give silica, a reaction which readily takes place when acid or alkaline catalysts are present; at appropriate concentrations the hydrolysis reaction proceeds to a stage at which a gel is formed.

One way of employing ethyl silicate is to mix it with water and sufficient ethyl alcohol to give a homogeneous liquid, and then to add a small amount of an acid catalyst to induce hydrolysis. The hydrolysis product thus obtained remains liquid for some time, which depends inter alia on the silica content of the solution, before setting to a gel, but it can be made to gel quickly by the action of an alkaline material. Shaped articles can be made from powdered refractory materials by mixing them with sufficient of the liquid hydrolysed silicate composition to act as a binder, forming the mixture into the desired shape and then allowing the mixture to stand and develop rigidity as the binder gels. The gelation of the binder can be accelerated by an alkaline material; thus ammonia solution can be added to the hydrolysed silicate immediately before mixing with the powdered material or, alternatively, an alkaline material such as magnesium oxide may be incorporated in the powdered material. Such a procedure is particularly useful for the production of refractory articles because the silicate contributes to the refractory properties of the article by the deposition of silica in the interstices between the particles of refractory material, thus forming a matrix for the particles.

Ethyl silicates have been employed as the binder for the investment in the manufacture of moulds for the casting of metals. In the manufacture of such moulds, a pattern of the required article made of wax or other expendable material, such as low melting point metals or alloys, is first given a thin coating with a finely powdered refractory material and a liquid binder made up into a thin slurry into which the pattern is dipped or with which the pattern is sprayed; it is necessary that the slurry should be flowable so that the complete contour of the pattern is covered. When this initial coating, which is called the primary investment or pre-investment coating, has dried, it is then invested in a coarse refractory material with which is mixed acid hydrolysed ethyl silicate solution to act as the binder. The investment may be effected in a number of ways known in the art, for example the coarse refractory and the binder liquid may be made up into a slurry with which the coated pattern is surrounded, the slurry being generally vibrated for a given time to pack the refractory powder around the pattern. Before the thin pre-investment coating has hardened it may be dusted with coarse refractory powder to provide a key for the investment, the latter sometimes being known as the secondary investment. The pattern investment is then allowed to set and thereafter the pattern is removed; for example in the case of a wax pattern the wax may be melted or dissolved by a suitable solvent such as trichloroethylene. It is desirable that the setting of the binder of the secondary investment should take place over a long period of time to allow for the packing of the refractory around the pattern, but after the packing the gelation of the binder may be accelerated by warming.

The binder employed for the thin primary investment coating is usually sodium silicate solution. Acid hydrolysed ethyl silicate solutions are not generally employed because mixtures of the solutions and refractory materials are usable for only very short lengths of time due to the fact that refractory materials are almost invariably alkaline, the alkalinity sometimes being due to impurities. Ethyl silicates are very readily hydrolysed and for this reason only small amounts of acid can be used in the preparation of the hydrolysate. Ethyl silicates are, however, much more rapidly hydrolysed in the presence of alkaline materials and a thin slurry made up from refractory materials and the acid hydrolysate for the purpose of providing the primary investment coating very soon thickens due to the acceleration of the hydrolysis and gelation by the refractory material and becomes unusable for forming this coating; a mixture of binder and refractory is frequently usable for only one to two hours. This property of the mixtures has been a bar to the extensive commercial use of ethyl silicates as binders for the primary investment coating in the manufacture of moulds for the casting of metals.

The mixture of acid hydrolysed ethyl silicate solution and refractory material used for the secondary investment also, of course, thickens with the passage of time due to the catalytic effect of the alkalinity of the refractory material on the gelation of the silicate, but in this case the problem is not so acute because a thin flowable slurry is not necessary for the secondary investment. Even so, such mixtures remain usable for this purpose for only relatively short periods and it is necessary to prepare fresh mixtures as stock for processing at frequent intervals; generally, the mixes are usable for not more than 3 hours depending on the alkalinity of the refractory materials. The use of acid hydrolysed ethyl silicate solutions for the binder of the secondary investment has another disadvantage in that since only small amounts of acid can be used in the preparation of the hydrolysate, variations in the alkalinity of the refractory materials causes the investment coatings from different mixes to set at different rates giving rise to differing degrees of packing around the mould pattern. Since it is the usual practice to give the moulds a given period of vibration to pack the refractory powder of the investment, variations in the consistency of the investment gives rise to variations in the moulds produced, and this in turn gives rise to variations in the castings produced from the moulds. If allowance is made for variations in the packing times, the rate of production of the moulds is adversely affected. It is not unusual when employing a highly alkaline batch of refractory material, such as certain fire clay grogs, with the hydrolysed ethyl silicate solution for the mixture to gel prematurely.

The disadvantage referred to of mixes of acid hydrolysed ethyl silicate solutions and refractory materials soon thickening and becoming unworkable is also significant in the manufacture of what are called "ceramic shell moulds." These moulds are made by applying to a pattern, a series of coatings of a mixture of finely-divided refractory material and a binder liquid made up into a thin slurry; if desired the wet coatings may be dusted with a coarse refractory to help in obtaining the desired thickness. Again the property of such mixes of soon becoming unworkable has been a bar to the extensive commercial use of ethyl silicates as a binder for making ceramic shell moulds.

Other hydrolysable alkyl silicates have also been proposed as binders for refractory materials, and methyl silicate and tetrabutyl orthosilicates have been specifically mentioned for such use, but although many alkyl silicates are known, none have hitherto been of interest for this purpose because up to now it has not been apparent that any possess any worthwhile advantage over ethyl silicates.

It is an object of the present invention to provide a process for preparing a mixture of particulate refractory material and a binder in which the binder employed is an acid hydrolysed alkyl silicate which has not previously been specifically proposed for use in such a process but which has unexpected properties which makes it particularly advantageous in such a process.

According to the present invention there is provided a process for preparing a mixture of a particulate refractory material and a binder, which comprises mixing the refractory material with an acid hydrolysed isopropyl silicate.

The present invention is based on the surprising discovery that isopropyl silicates are very resistant to hydrolysis as compared with ethyl silicates. Whereas it would be expected that isopropyl silicates would be to some extent more difficult to hydrolyse than ethyl silicates by reason of the larger alkyl group, it has been unexpectedly found that isopropyl silicates are much more resistant to hydrolysis than would have been expected; this is evidenced by the fact that hydrolysis is much slower than is the case for both normal propyl and normal butyl silicates (for hydrolysates of the same silica concentration). This surprising property makes isopropyl silicates, especially those having a silica content of 30% by weight and over, particularly advantageous binders and more particularly they offer practical advantages over the ethyl silicates. As described above, acid hydrolysed solutions of ethyl silicates have the practical disadvantage that mixes of them with powdered refractory materials remain usable for only short periods but since isopropyl silicates are more difficult to hydrolyse, mixes of their acid hydrolysates with refractory materials can be prepared which have a relatively long useful life; such mixes are especially valuable for the preparation of primary investment coatings and for the manufacture of shell moulds. Mixes employing, as the binder medium, isopropyl silicate acid hydrolysates with a silica content of 10 to 19% by weight, have been prepared with a useful working life of 7 to 8 days. Furthermore, by reason of the high resistance to hydrolysis and gelatin, any variation in the alkalinity of different batches of refractory material employed for making up different quantities of the mix will be much less significant in determining the setting rate of secondary investment coatings. Thus mixes employing isopropyl silicate hydrolysates as the binder permit of more uniform packing of the refractory around the pattern. The greater resistance to hydrolysis also means that more acid can be used in the preparation of the hydrolysate than can be used for the preparation of ethyl silicate hydrolysates; although larger amounts of acid tend to reduce to some extent the working life of a mix, a high degree of immunity is obtained from any variation in the setting time due to variations in the alkalinity of the refractory materials: this is of importance when the mixes are used for producing secondary investments. An even further advantage of the greater resistance to hydrolysis of isopropyl silicates, is that the presence in the silicate of residual acid formed as a by-product in the production of the silicate is less significant in determining the rate of hydrolysis of hydrolysates prepared from the silicates; in the case of ethyl silicates, residual acid has a considerable influence on the behaviour of the hydrolysates.

As examples of refractory materials used in the process of the invention may be mentioned sillimanite, fire clay grogs, calcined kaolin, silica, cristobalite, quartz and alumina.

Tetraisopropyl orthosilicate can be employed in the process of the invention, or the silicate can be an isopropyl polysilicate or mixture of such materials with or without the orthosilicate. Isopropyl polysilicate materials are in fact preferable, for they provide a greater weight of silica for a given amount of silicate than does the orthosilicate. Preferably the isopropyl silicate is one which contains at least 30% by weight of silica as organic silicate.

Tetraisopropyl orthosilicate can be prepared by direct reaction of isopropyl alcohol with silicon tetrachloride. Isopropyl polysilicate materials containing some tetraisopropyl orthosilicate can be obtained by the reaction of silicon tetrachloride with isopropyl alcohol containing a small amount of water insufficient to react with more than two of the four chlorine atoms of the silicon tetrachloride. The isopropyl silicate for use in the process of the invention is preferably one which has been prepared by esterifying silicon tetrachloride with isopropyl alcohol containing sufficient water to react with between 1.2 and 2 chlorine atoms of the silicon tetrachloride molecule—this amount corresponds to the use of between 0.6 and 1.0 mol. of water for each mol. of silicon tetrachloride—and sufficient isopropyl alcohol to replace the remaining chlorine atoms. Isopropyl silicates consisting mainly or substantially of polysilicate can be obtained by using a proportion of water corresponding to approaching 2 chlorine atoms in the silicon tetrachloride molecule.

One procedure for preparing the isopropyl silicate is to add the mixture of water and isopropyl alcohol gradually to ice-cold silicon tetrachloride. An alternative procedure which is preferable is one in which the reactants are mixed by running them slowly together and passing the mixture into a suitable reactor. Preferably excess isopropyl alcohol (for instance, 1 mol. excess per mol. of silicon tetrachloride) is used in order to assist completion of the reaction with elimination of all chlorine as hydrogen chloride. It is important to eliminate substantially all the chlorine for otherwise the behaviour of the product on hydrolysis is affected. Excess isopropyl alcohol is in practice essential when the water content of the reaction mixture is between 0.75 and 1 mol. per mol. of silicon tetrachloride (corresponding to between 1.5 and 2 of the chlorine atoms present). After the reagents have been mixed together and hydrogen chloride evolution has slackened the esterification is completed by refluxing at an elevated temperature, which also serves to remove dissolved hydrogen chloride, followed by distillation to remove any excess isopropyl alcohol if this is desired. The isopropyl alcohol recovered can then be used again, any hydrogen chloride dissolved in it being allowed to remain.

In the initial stage of the reaction between silicon tetrachloride and isopropyl alcohol, some silicon tetrachloride is lost by evaporation with the hydrogen chloride evolved. The yield of isopropyl silicate may be increased by passing the hydrogen chloride gas through isopropyl alcohol and adding this alcohol to the reaction mixture or, alternatively, employing it in the preparation of a further quantity of isopropyl silicate.

Instead of refluxing to complete the esterification reaction, the small proportion of chlorine atoms remaining attached to silicon after the initial reaction can be removed by adding methyl or ethyl alcohol, thus, introducing a small proportion of methyl or ethyl groups into the isopropyl silicate without seriously affecting its properties: reaction is then allowed to continue until esterification is substantially complete. Up to a quarter of the original chlorine content of the silicon tetrachloride can be replaced by methoxy or ethoxy groups in this way in the preparation of orthosilicates, giving an isopropyl methyl silicate or an isopropyl ethyl silicate; for polysilicates there may be introduced up to 0.125 methyl or ethyl groups per silicon atom. The dissolved hydrogen chloride can be removed by aeration, but preferably it is removed by refluxing and any excess alcohol can be distilled off if desired. Isopropyl polysilicate materials can also be obtained by the partial hydrolysis of tetraisopropyl orthosilicate using corresponding amounts of water.

It has been found possible to prepare stable liquid isopropyl silicates having a high silica content and comprising a mixture of orthosilicate and polysilicate materials; these silicates are particularly suitable for use in processes in accordance with the invention. Such isopropyl silicates may be prepared by either of the following two novel processes. The first process comprises: adding gradually to silicon tetrachloride a mixture of water and isopropyl alcohol, the total amount of added water (of which some may be present in the alcohol) being from 0.75 to 1 mol., preferably from 0.875 to 1 mol., per mol of silicon tetrachloride and the amount of isopropyl alcohol (calculated as anhydrous alcohol) being equivalent to more than 4 mols but less than 5 mols of isopropyl alcohol per mol of silicon tetrachloride; and raising the temperature to the boiling point of isopropyl alcohol at which temperature the mixture is refluxed preferably for at least 1 hour, for example from 1 to 4 hours.

The second process comprises heating isopropyl orthosilicate containing dissolved hydrogen chloride gas (preferably the silicate is a crude product obtained by reaction of silicon tetrachloride and isopropyl alcohol) at from 40° C. to 55° C., preferably at from 45° C. to 50° C.; adding thereto isopropyl alcohol and water, the total amount of water being from 0.75 mol. to 1 mol., preferably from 0.875 to 1 mol., per mol of isopropyl silicate, whereby an exothermic reaction ensues and hydrogen chloride gas is liberated; and allowing the temperature to rise to the boiling point of isopropyl alcohol at which temperature the mixture is preferably refluxed for at least 30 mins., for example for 1 hour. In this process, anhydrous isopropyl alcohol may be used or the process may be carried out with the commercially available isopropyl alcohol containing up to 1% water by weight. When using this isopropyl alcohol, the water present in the alcohol must be allowed for and included in the quantity of water specified.

It has been found that in the second process described above, the temperature of the isopropyl orthosilicate to which addition is made is critical if a stable high silica content isopropyl silicate which contains orthosilicate is to be obtained. If the temperature is too low, the reaction mixture is too acidic and gelatinous material is formed and if the temperature is too high, the mixture does not contain sufficient acid to catalyse the polymerisation of the orthosilicate to the desired extent.

Isopropyl silicate which has a high silica content and yet contains orthosilicate is especially valuable for use in the manufacture of moulds for the casting of metals in accordance with the invention, since these silicates permit moulds to be made which are more rigid and firmer than those prepared from silicates of similar silica content but which do not contain orthosilicates. This is due to the fact that the isopropyl orthosilicate molecules act to cross link the polysilicate chains in the gelation of the silicate.

By the processes described stable isopropyl silicates can be prepared having a silica content of over 35% by weight even though containing a proportion of orthosilicate material.

For the preparation of the isopropyl silicate hydrolysates employed in the process of the invention, hydrochloric acid is particularly suitable, but sulphuric acid can also be used. The hydrolysis is conveniently conducted in the presence of a solvent, and it is suitable to use isopropyl alcohol for this purpose. Water is employed in the hydrolysis in an amount sufficient to hydrolyse all the isopropyl groups and produce silica.

The invention is illustrated by the following examples.

Examples 1 to 12 describe the preparation of isopropyl silicates; Examples 13 to 21 describe the preparation of acid hydrolysates of isopropyl silicates; Examples 22 to 24 describe the preparation of mixes of powdered refractory materials and isopropyl silicate acid hydrolysates; Examples 25 to 27 describe processes for binding particulate solid materials employing isopropyl silicates as binder; and Example 28 describes experiments to compare the rate of hydrolysis of isopropyl silicates with that of two other alkyl silicates.

Example 1

Isopropyl alcohol (173 g.) with which a small amount of distilled water (11.75 cc.) had been incorporated was introduced slowly into silicon tetrachloride (170 g.) contained in a flask surrounded by ice. In this addition 0.65 mol. of water was used for each mol. of silicon tetrachloride. When the addition was complete the esterification was finished by heating the mixture under reflux until hydrogen chloride evolution ceased (30 mins.). The last traces of hydrogen chloride were removed by bubbling dry air through the mixture, and excess isopropyl alcohol (25 g.) was then distilled off, leaving a crude product (173 g.) containing isopropyl orthosilicate and polysilicates having a silica content of 31%. By distillation at atmospheric pressure up to 200° C. tetraisopropyl orthosilicate (82.5 g.), B.P. 192° C., was removed, leaving a liquid mixture of isopropyl polysilicates (90.5 g.) having a refractive index of $n_D^{20}$ 1.409 and a silica content of 40.3%.

Example 2

Isopropyl alcohol (465.3 g.) to which a small amount of distilled water (24.7 cc.) had been added, was introduced slowly into silicon tetrachloride (340 g.) the amount of water used corresponding to 0.69 mol, for each mol. of silicon tetrachloride, and the isopropyl alcohol being in an excess of 1 mol. per mol. of the tetrachloride. On completion of the addition two layers were present: the mixture was then heated for 10 minutes before it became homogeneous, and refluxed for 2½ hours to remove hydrogen chloride. Excess isopropyl alcohol (236.5 g.) was removed by distillation, giving a crude isopropyl silicate (297.5 g.) having a silica content of 31.2%. Treatment with Fuller's earth (1% by weight) gave a clear acid-free product. The tetraisopropyl orthosilicate content (10%) was removed by distillation at atmospheric pressure up to 200° C., leaving a liquid mixture of isopropyl polysilicates.

Example 3

Silicon tetrachloride (1700 g.) was esterified with a mixture of isopropyl alcohol (2326 g.) and distilled water (123 cc., 0.68 mol. per mol. of the tetrachloride) by running them slowly together and allowing the mixture to flow into a reaction flask. The reaction mixture separated into two layers, which were allowed to stand for one hour and then refluxed for 90 minutes. After this, excess isopropyl alcohol (815 g.) was distilled off, the distillation being discontinued when the temperature of the reaction mixture was 195° C., leaving a crude isopropyl silicate (1865 g.) containing 29.8% by weight of silica and having a hydrochloric acid content of 0.017%. By further distillation of the crude material at atmospheric pressure up to 200° C., its orthosilicate content (14%) was removed, leaving a liquid isopropyl polysilicate mixture having a silica content of 32.4%.

Example 4

A mixture of isopropyl alcohol (232.6 g.) and distilled water (17.3 cc.) was gradually added to silicon tetrachloride (170 g.), the amount of water corresponding to 0.96 mol. per mol. of the tetrachloride. When addition was complete, the mixture was refluxed for 1 hour and left overnight. Excess isopropyl alcohol (137.5 g.) was then removed by distillation up to 100° C., leaving a substantially neutral crude isopropyl silicate having a silica content of 38.05%. Further distillation of the product at atmospheric pressure up to 200° C. removed its orthosilicate content (5.4%), leaving a mixture of isopropyl polysilicates having a silica content of 38.5%.

Example 5

A similar procedure to that described in Example 4 was carried out, except that the reflux time was increased to 4 hours: the crude isopropyl silicate then obtained (127.5 g.) had a silica content of 39.5%, and by further distillation up to 200° C. to remove its orthosilicate content (3%), a polysilicate mixture having a silica content of 40.7% was obtained.

Example 6

21¼ lb. of silicon tetrachloride were reacted with 30 lb. of isopropyl alcohol (containing 1% water by weight) by adding the alcohol slowly to the silicon tetrachloride. When the addition was complete, the reaction mixture was warmed to 50° C., air flowing at a rate of 72 litres per hour being passed through the reaction mixture. When the temperature of the reaction mixture reached 50° C., a mixture of 1 lb. 14 oz. of water and 3 lb. of isopropyl alcohol (containing 1% water by weight) was slowly added, the reaction being exothermic. The temperature rose to the boiling point of isopropyl alcohol at which temperature the reaction mixture was refluxed for one hour. During the addition and reflux the air flow was maintained. Excess isopropyl alcohol was now distilled off, the distillation being stopped when the temperature of the product in the reaction vessel reached 120° C. The air flow was maintained during the distillation. 21 lb. 11 oz. of isopropyl alcohol were recovered. The yield of isopropyl silicate was 18 lb. (89%). This isopropyl silicate had a silica content of 37.1%, and an orthosilicate content of 19.4%, as shown by distillation of a sample at atmospheric pressure up to 200° C. In this preparation the molar ratio $SiCl_4:H_2O$ is 1:0.98.

Example 7

This example is similar to Example 6 but employs for the isopropyl alcohol used to react with the silicon tetrachloride, isopropyl alcohol recovered from previous preparations of isopropyl silicate, together with fresh isopropyl alcohol. The recovered isopropyl alcohol will contain dissolved hydrogen chloride gas, and in calculating the weight of isopropyl alcohol, due allowance is made for this.

21¼ lb. of silicon tetrachloride were reacted with 16 lb. of fresh isopropyl alcohol, and 16 lb. of isopropyl alcohol recovered from a previous isopropyl silicate preparation. Titration with standard alkali showed that the recovered isopropyl alcohol contained 2 lb. of dissolved hydrogen chloride gas. The reaction was completed as described in Example 6. The isopropyl silicate yield was 17 lb. 10 oz. (89.6%). The silica content was 37.9% and the orthosilicate content was 7%, as shown by distillation of a sample at atmospheric pressure up to 200° C.

Example 8

In the initial stage of the reaction between silicon tetrachloride and isopropyl alcohol, some silicon tetrachloride is lost by evaporation with the hydrogen chloride evolved. The yield of isopropyl silicate may be increased by passing the hydrogen chloride gas through isopropyl alcohol. This example and the next two examples show how the yield may be increased in this way. In each of these examples the isopropyl alcohol used was an isopropyl alcohol containing 1 percent of water by weight.

60 g. of isopropyl alcohol were added slowly to 170 g. of silicon tetrachloride, and the hydrogen chloride evolved was passed through 180 g. of isopropyl alcohol. When the addition was complete this isopropyl alcohol was added to the reaction mixture. The mixture was then warmed to 50° C. and a mixture of 15 g. of water and 24 g. isopropyl alcohol added. The reaction mixture was refluxed for 1 hour and excess isopropyl alcohol distilled off. The yield of isopropyl silicate was 94.3%.

Example 9

240 g. of isopropyl alcohol were added slowly to 170 g. of silicon tetrachloride. The hydrogen chloride evolved during the addition of the first 120 g. of isopropyl alcohol was passed through 120 g. of isopropyl alcohol. This isopropyl alcohol was used to react with a second quantity of 170 g. of silicon tetrachloride, this reaction being finished with 120 g. of isopropyl alcohol. The preparation was completed for each batch as described in Example 8. The yield of isopropyl silicate from the batch to which the isopropyl alcohol used to scrub the hydrogen chloride was added was 97.5 percent.

Example 10

120 g. of isopropyl alcohol were added slowly to 170 g. of silicon tetrachloride, and the hydrogen chloride evolved was passed through 120 g. of isopropyl alcohol. When the addition was complete, this isopropyl alcohol was added to the reaction mixture. The preparation was completed as described in Example 8. The yield of isopropyl silicate was 98.3%.

Example 11

This example describes the preparation of an isopropyl methyl silicate containing a small proportion of methyl groups.

Isopropyl alcohol (173 g.) with which a small amount of distilled water (11.75 cc.) had been incorporated was introduced slowly into silicon tetrachloride (170 g.), the amount of water corresponding to 0.65 mol. for each mol. of silicon tetrachloride. When the addition was complete 98% methyl alcohol (16 g.) was added and the mixture was refluxed for 2½ hours. Excess alcohols (86 g.) were then removed by distillation at atmospheric pressure up to 100° C., leaving a crude isopropyl silicate product (132 g.). This product was substantially neutral and had a silica content of 35.5%. The orthosilicate content (15%) of the product was removed by distillation at atmospheric pressure up to a temperature of 200° C., leaving a liquid mixture of isopropyl methyl polysilicates having a silica content of 36.6%.

Example 12

This example describes the preparation of an isopropyl ethyl silicate containing a small proportion of ethyl groups.

A mixture of 10 g. distilled water and 175 g. of isopropyl alcohol, which contained 1% by weight of water, was added slowly to 170 g. of silicon tetrachloride. 23 g. of absolute ethyl alcohol were now added to the mixture, which was refluxed for two hours. The excess alcohols were distilled off (B. Pt. 80–110° C.), 61 g. being recovered. 171 g. of isopropyl ethyl silicate remained. This had a silica content of 31.4%, and contained 19.2% of material distilling below 200° C. The residue remaining after removal of material distilling below 200° C. had a silica content of 34.4%.

Example 13

This example describes the preparation of a liquid hydrolysate of an isopropyl silicate.

A hydrolysing solution was prepared containing 85 cc. of isopropyl alcohol and 25 cc. of distilled water, together with 0.5 cc. of concentrated hydrochloric acid as catalyst. To this hydrolysing solution was added the mixture of isopropyl orthosilicate and polysilicates obtained in Example 1 (104 cc.). The mixture was stirred until it became homogeneous (50 min.), thus giving a liquid hydrolysate.

For use as a binder, the hydrolysate is preferably left overnight before use. When 20 cc. of the liquid hydrolysate of isopropyl silicates was mixed with 3 cc. of a gelation accelerator, prepared by adding 4 parts by volume of 0.88 S.G. aqueous ammonia to 100 parts of distilled water, the mixture set to a hard gel in 2 minutes, 15 seconds. The hydrolysate was found to have a shelf life of 4 days before gelling without an accelerator.

Example 14

The product of Example 3 having a silica content of 35.5% (52 cc.) was mixed with the binary azeotrope of isopropyl alcohol and water (50 cc.) and dilute hydrochloric acid (2N, 5 cc.). The mixture was stirred until it become homogeneous (5 min.) and allowed to stand for 30 min., thus giving a liquid hydrolysate suitable for use in the process of the invention.

For use as a binder, the hydrolysate is preferably left over night before use. When 20 cc. of the hydrolysate was mixed with 3.5 cc. of 0.6 N ammonia solution, rapid gelation took place, a hard gel being formed in 200 seconds.

Example 15

Hydrolysates were prepared using the product of Example 2 having a silica content of 31.2% and the ingredients given in the table below. In each instance the ingredients were mixed, the mixture stirred until it was homogeneous, and allowed to stand until it was tested for its gelling properties by treatment of 20 cc. of the hydrolysate with accelerator as indicated.

|  | Hydrolysate A | Hydrolysate B |
|---|---|---|
| Quantities (cc.): |  |  |
| Silicate | 184 | 52 |
| Azeotrope of isopropanol and water | 100 | 60 |
| 2 N hydrochloric acid | 10 |  |
| Conc. hydrochloric acid (S.G. 1.16) |  | 0.25 |
| Distilled water |  | 5 |
| Time for homogeneity (min.) | 43 | 22 |
| Accelerator (cc.) added to 20 cc. hydrolysate: |  |  |
| 0.6 N ammonia solution | 3.5, 4.0, 5.0 | 3.0 |
| Time of addition after formation of hydrolysate (days) | 1, 2, 5, 1, 1 | 1, 12 |
| Time required for gelation (seconds) | 190, 180, 190, 55, 20 | 20, 14 |

Example 16

A hydrolysate was prepared by adding a mixture of industrial methylated spirit (100 cc.) and 2 N hydrochloric acid (10 cc.) to the isopropyl silicate of Example 5 containing 31.2% by weight of silica (104 cc.) and stirring the mixture until it became homogeneous (23 min.). The hydrolysate after standing overnight gelled in 45 seconds when 20 cc. were mixed with 2 cc. of an accelerator prepared by diluting concentrated ammonia solution (S.G. 0.88) with 10 times its volume of water.

Example 17

A hydrolysing solution was prepared by mixing 200 ml. of 64 overproof industrial ethyl alcohol with 20 ml. of 2 N $H_2SO_4$ solution. 200 ml. of isopropyl polysilicate, prepared as described in Example 7 were added to the hydrolysing solution. The mixture was stirred until it became homogeneous (150 minutes). During this time the temperature rose 2.2° C.

Example 18

A hydrolysing solution was prepared by mixing 50 ml. of the binary azeotrope of isopropyl alcohol and water with 5 ml. of 2 N hydrochloric acid solution. To this hydrolysing solution were added 52 ml. of the isopropyl ethyl silicate whose preparation is described in Example 12. The mixture was stirred until it became homogeneous (40 minutes). During this time there was a temperature rise of 3.7° C.

Example 19

A hydrolysing solution was prepared by mixing 200 ml. of the binary azeotrope of isopropyl alcohol and water with 20 ml. of water and 0.44 ml. of concentrated hydrochloric acid solution. 180 ml. of isopropyl polysilicate, prepared as described in Example 6, were added, and the mixture stirred overnight.

Example 20

A hydrolysing mixture was prepared from 16 ml. of water, 4.4 ml. of N/1 hydrochloric acid solution and 200 ml. of the binary azeotrope of isopropyl alcohol and water. To this mixture was added 180 ml. of isopropyl silicate, prepared as described in Example 6. The mixture was stirred for 40 minutes, when it became homogeneous, to give a hydrolysate suitable for use in the process of the invention. This hydrolysate was stored overnight before use.

Example 21

A hydrolysing mixture was prepared from 41 ml. of water, 10 ml. of N/1 hydrochloric acid solution, and 200 ml. of the binary azeotrope of isopropyl alcohol and water. To this was added 208 ml. of isopropyl silicate, prepared as described in Example 6. The mixture was stirred for 6 hours, then warmed to 50° C. for 10 minutes. On standing overnight it became homogeneous giving a hydrolysate suitable for use in the process of the invention.

Example 22

This example concerns the preparation of a mixture of particulate refractory material and a binder. Sufficient sillimanite, all passing a 200 mesh sieve (see British Standard Specification 410 of 1943) was added to the acid hydrolysed isopropyl silicate solution prepared in accordance with Example 19, to give a thin slurry. The slurry remained useful for forming ceramic shell moulds and for providing primary investment coating for 7 to 8 days.

Example 23

A secondary investment slurry was prepared by mixing with 200 ml. of the hydrolysate prepared in accordance with Example 20, 450 g. of refractory powder comprising a mixture of zircon and calcined kaolin, the mixture being of such particle size that all passed a 10 mesh sieve and 20% by weight of the mixture passed a 200 mesh sieve. This slurry remained satisfactory for use for 8 hours after mixing and could still be used even 24 hours after mixing, as shown by the refractory powder packing hard on vibration, although after 24 hours the packing times of the mixture was longer than that generally employed in the production of moulds by the investment process.

The alkalinity of the refractory material employed in this example was such that 100 g. of material was equivalent to 1.8 ml. of N/1 NaOH solution. The alkalinity was determined by mixing 100 g. of the refractory powder mixture with 40 ml. of N/1 hydrochloric acid solution, allowing the mixture to react for 2 hours, then titrating excess acid with N/1 NaOH solution.

Example 24

A secondary investment slurry was prepared by mixing with 200 ml. of the hydrolysate prepared in accordance with Example 21, 450 g. of the refractory material employed in Example 23. This slurry remained satisfactory for use for 8 hours after mixing and could still be used even 24 hours after mixing, as shown by the refractory powder packing hard on vibration, although after 24 hours the packing time of the mixture was longer than that generally employed in the production of moulds by the investment process.

*Example 25*

A mixture of refractory powder and liquid binder was prepared as described in Example 22. This mixture was shaped around an expendable pattern of wax by dipping the pattern into the slurry; the thin wet coating was then dusted with sillimanite. The primary investment coating thus formed was allowed to harden, by evaporation of the isopropyl alcohol solvent, for at least 3 hours.

*Example 26*

A ceramic shell mould was prepared by dipping a wax pattern into a slurry prepared in accordance with Example 22, allowing the coating to harden by evaporation of the isopropyl alcohol solvent, followed by repeating the dipping and hardening operation until a shell of adequate thickness was obtained. If desired, the coated pattern may be dusted with coarse sillimanite (pasing a 30 mesh sieve and retained on an 80 mesh sieve) before the coatings harden.

*Example 27*

This example concerns the manufacture of a mould by the investment process and its use for the casting of a metal article.

A wax pattern of the article to be cast was first given a thin primary investment coating by the method described in Example 25. The coated pattern was then placed in a container which was filled with the secondary investment slurry described in Example 23 and the container vibrated to pack the refractory powder around the pattern. Surplus liquid was then poured off and the mould trimmed by removing the top layer of fine particles.

The isopropyl silicate binder was then gelled and the mould dried by heating to 40° to 45° C. for 36 to 48 hours after which the wax pattern was removed by heating at 95° to 100° C. for 24 hours. The de-waxed mould was fired to 1000° C. in the course of 8 hours and held at this temperature for 2 hours. Metal was then cast into the hot mould and after cooling the metal casting was removed from the mould.

*Example 28*

To compare the hydrolysis behaviour of ethyl silicate, isopropyl silicate, and butyl silicate, n-butyl silicate was prepared by the method of Example 10. The product obtained had a silica content of 23.0%.

The ethyl silicate used was a commercial product containing 40% silica. The isopropyl silicate used was prepared as described in Example 7. Each silicate was treated in the same way, being added in one quantity to a hydrolysing solution prepared by mixing water, and concentrated hydrochloric acid solution, with the binary azeotrope of isopropyl alcohol and water. The ethyl silicate and isopropyl silicate were taken as being equivalent on a volume for volume basis, and the amount of the n-butyl silicate taken was such as to contain the same amount of silica as the amount of ethyl silicate. For each silicate, the time required for the solution to reach maximum temperature, and the temperature rise, were observed. The quantities taken are given below:

(a) Hydrolysis of ethyl silicate:

|  | Ml. |
|---|---|
| Ethyl silicate | 90 |
| Binary azeotrope water-isopropyl alcohol | 100 |
| Water | 10 |
| Conc. hydrochloric acid solution | 1.3 |

(b) Hydrolysis of n-butyl silicate:

| n-Butyl silicate | 154 |
|---|---|
| Binary azeotrope water-isopropyl alcohol | 100 |
| Water | 10 |
| Conc. hydrochloric acid solution | 1.3 |

(c) Hydrolysis of isopropyl silicate:

| Isopropyl silicate | 90 |
|---|---|
| Binary azeotrope water-isopropyl alcohol | 100 |
| Water | 10 |
| Conc. hydrochloric acid solution | 1.3 |

These quantities are typical of the preparation of a binding liquid for use in the investment process. The times required for each solution to reach maximum temperature, and the temperature rise were:

Ethyl silicate—Temp. rise of 16.0° C. in 4 mins.
n-Butyl silicate—Temp. rise of 17.1° C. in 14 mins.
Isopropyl silicate—Temp. rise of 1.0° C. in 20 mins.

This shows the very much slower hydrolysis of isopropyl silicate.

During the hydrolysis of the ethyl silicate and n-butyl silicate the solutions became cloudy whereas this was not the case with the isopropyl silicate solution.

What is claimed is:

1. A process for preparing a silicate consisting of a mixture of orthosilicate and polysilicate materials, which process comprises the steps of: adding gradually to silicon tetrachloride a mixture of water and isopropyl alcohol, the total amount of added water being from 0.75 to 1 mol., preferably from 0.875 to 1 mol., per mol. of silicon tetrachloride and the amount of isopropyl alcohol (calculated as anhydrous alcohol) being equivalent to more than 4 mols. but less than 5 mols. of isopropyl alcohol per mol. of silicon tetrachloride; and raising the temperature to the boiling point of isopropyl alcohol.

2. A process for preparing a silicate and consisting of a mixture of orthosilicate and polysilicate materials, which process comprises the steps of: heating isopropyl orthosilicate containing dissolved hydrogen chloride gas at from 40° C. to 55° C.; adding thereto isopropyl alcohol and water, the total amount of water being from 0.75 to 1 mol., per mol. of isopropyl silicate, whereby an exothermic reaction ensues and hydrogen chloride gas is liberated; and allowing the temperature to rise to the boiling point of isopropyl alcohol at which temperature the mixture is refluxed.

3. As a new composition of matter which is particularly useful in the production of a shell mold for the casting of metal comprising an admixture of a refractory material and an acid hydrolysed isopropyl silicate.

4. A composition according to claim 3 wherein said silicate has a silica content of at least 30 percent by weight.

5. In a process for manufacturing a shell mould and the casting of metals, in which process an expendable pattern is provided with a series of thin coatings of a mixture of a fine refractory powder and a liquid binder in the form of a thin slurry, each coating being allowed to harden at least partially before the next is provided, and the coatings being dusted with particulate refractory material between successive coatings, if desired, and after which the coatings are then hardened and the pattern removed; the step of employing as a liquid binder an acid hydrolysed isopropyl silicate, and then casting metal into the mould.

6. In a process for the manufacture of a mould and the casting of metals, in which process an expendable pattern is invested in a mixture of a refractory material and a liquid binder, the investment hardened and the pattern removed; the step of employing as the liquid binder an acid hydrolysed isopropyl silicate, and casting metal into the mould.

7. In a process for the manufacture of a mould and the casting of metals, in which process an expendable pattern is provided with a thin coating of a mixture of a fine refractory powder and a liquid binder in the form of a thin slurry, the coated pattern then invested in a mixture of a refractory and a binder, the investments hardened, the pattern removed and metal cast into the mould; the step of employing for the binder of the primary investment coating an acid hydrolysed isopropyl silicate.

References Cited in the file of this patent

UNITED STATES PATENTS

| | | |
|---|---|---|
| 1,959,747 | Svendsen | May 2, 1934 |
| 1,959,748 | Svendsen | May 22, 1934 |
| 2,703,913 | Hinde et al. | Mar. 15, 1955 |
| 2,932,864 | Mellen et al. | Apr. 19, 1960 |
| 2,945,273 | Herzmark et al. | July 19, 1960 |

UNITED STATES PATENT OFFICE
CERTIFICATE OF CORRECTION

Patent No. 3,070,861                                     January 1, 1963

Harold Garton Emblem et al.

It is hereby certified that error appears in the above numbered patent requiring correction and that the said Letters Patent should read as corrected below.

In the heading to the printed specification, after line 8, insert -- Claim priority, application Great Britain Mar. 18, 1959 --; column 3, line 54, for "gelatin" read -- gelation --; column 6, line 34, for "isop opyl" read -- isopropyl --; column 9, part of the table which starts at line 50, should appear as shown below instead of as in the patent:

| | | | | |
|---|---|---|---|---|
| Time for homogeneity (min.) | 43 | | | 22 |
| Accelerator (cc.) added to 20 cc. hydrolysate | | | | |
| 0.6N ammonia solution | 3.5 | 4.0 | 5.0 | 3.0 |
| Time of addition after formation of hydrolysate (days) | 1  2 | 5 | 1 | 1  1, 12 |
| Time required for gelation (seconds) | 190, 180, 190, | 55, | 20 | 20, 14 | column 10, line 47, for "coating" read -- coatings --; line 60, for "times" read -- time --; column 11, line 24, for "pasing" read -- passing --; column 12, line 35, strike out "and".

Signed and sealed this 19th day of November 1963.

(SEAL)
Attest:

ERNEST W. SWIDER
Attesting Officer

EDWIN L. REYNOLDS
Acting Commissioner
of Patents